UNITED STATES PATENT OFFICE.

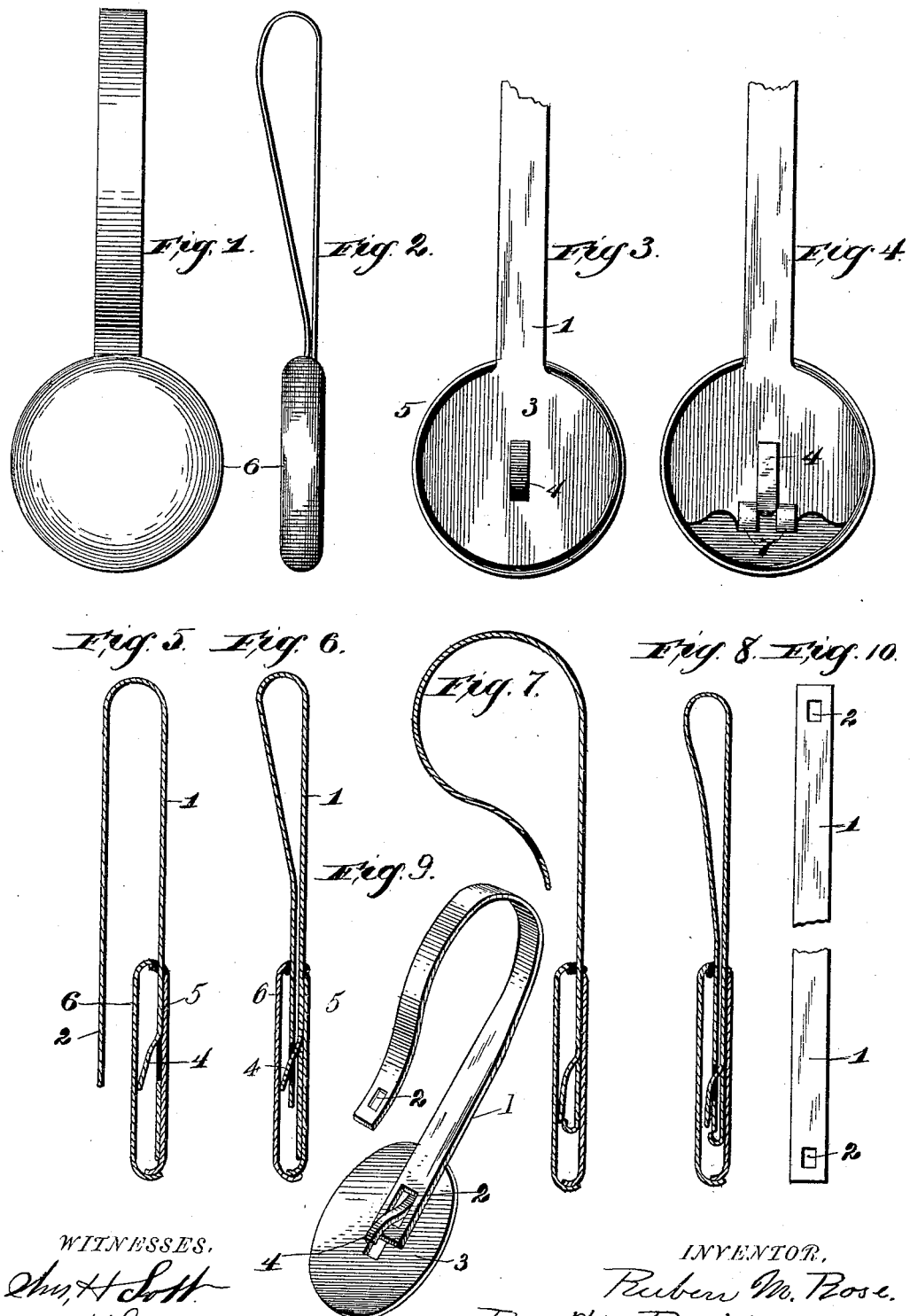

REUBEN M. ROSE, OF NORWALK, CONNECTICUT.

SEAL.

SPECIFICATION forming part of Letters Patent No. 390,988, dated October 9, 1888.

Application filed March 8, 1888. Serial No. 266,630. (No model.)

*To all whom it may concern:*

Be it known that I, REUBEN M. ROSE, of Norwalk, county of Fairfield, and State of Connecticut, have invented new and useful Improvements in Seals; and I do hereby declare that the following is a full and exact description of the same, reference being had to the accompanying drawings, and to the letters of reference marked thereon.

This invention is designed for use in a similar manner to other devices of this class; and it consists in certain peculiarities of construction, as will be fully described hereinafter.

In the drawings, Figure 1 represents a front view of the complete seal as it appears when in use. Fig. 2 is an edge view of the same. Fig. 3 is a view of the main portion of one form of the seal. Fig. 4 is a similar view of another form. Fig. 5 is a sectional view of the form shown in Fig. 3. Fig. 6 is a similar view with the slotted end hooked over tongue 4 of the disk portion 3, as shown in Fig. 3. Fig. 7 is a sectional view of the main form shown in Fig. 4. Fig. 8 is a similar view with the slotted end hooked over the tongue 4 of the disk portion 3 and held by tongues 7 7, as shown in plate, Fig. 4. Fig. 9 is a perspective view showing the shackle 1, with slotted ends 2 2, as shown in Fig. 10, and disk portion 3, as shown in Fig. 3. Fig. 10 is a shackle having slots or loops 2 2 at one or both ends, as the case may require, to engage in tongue 4, as shown in disk portion 3.

To enable others skilled in the art to make my improved seal, I will proceed to describe fully the construction of the same.

Figs. 3, 5, 6, 9, and 10 represent a shackle of any proper length and width, which is provided at its end with a slot, 2.

Figs. 3, 5, 6, and 9 show the inside disk portion, 3, and tongue 4 with the shackle 1 attached.

Fig. 5 represents a disk, 5, for one side of the seal, and 6 a similar disk, which is provided with an overhanging rim adapted to be closed down upon the periphery of disk 5 after the disk portion 3, having the tongue 4, is placed between the disks 5 and 6. By this means the seal is made complete.

The manner of using the seal is substantially as follows: The seal being in the condition indicated in Fig. 5, its slotted end 2 is passed through the eye or staple or other parts which it is desired to secure or fasten. The shackle 1 is passed down through the opening of disks 5 and 6 a distance sufficient to catch the slot 2 over the tongue 4, as shown in Fig. 6. By means of this construction a perfectly secure fastening is obtained.

In the modification shown in Fig. 4 an additional tongue, 7 7, is provided, to hold the slotted end 2 on tongue 4, as shown in Fig. 8.

Having thus fully described my invention, what I claim as new, and desire to secure by Letters Patent, is—

1. In a seal, the combination of the disks 5 and 6, inclosing a spring or other retaining device, and the shackle 1, having the slots 2, with the disk portion 3, having the tongues 4 and 7 7, the whole being united, as and for the purpose described.

2. The seal described having the shackle 1, with slot 2, and disk portion 3, having tongue 4, and disks 5 and 6, the whole being united, as and for the purpose described.

This specification signed and witnessed this 25th day of February, 1888.

REUBEN M. ROSE.

Witnesses:
EDDIE THOMAS,
ANDREW SELLECK.